United States Patent [19]

Korshak et al.

[11] 3,850,820

[45] Nov. 26, 1974

[54] ANTIFRICTION STRUCTURAL MATERIAL PRODUCED FROM COMPOSITION COMPRISING CARBORANE-CONTAINING POLYMER BINDERS AND SOLID LUBRICANT

[76] Inventors: Vasily Vladimirovich Korshak, ulitsa Gubkins, 4, kv. 81; Irina Alexandrovna Gribova, ulitsa Vavilova, 12, kv. 31; Alla Nikolaevna Chumaevskaya, ulitsa Novatorov, 40, korpus 4, kv. 24; Boris Mikhailovich Mgeladze, Profsojuznaya ulitsa, 28, kv. 35; Nina Ivanovna Bekasova, Profsojuznaya ulitsa, 43, B, kv. 15; Ljudmila Grigorievna Komarova, B. Akademicheskaya ulitsa, 53a, kv. 6; Svetlana Vasilievna Vinogradova, ulitsa Miklukho-Maklaya, 30, korpus 2, kv. 63; Petr Maximilianovich Valetsky, Mazhorov pereulok, 4, kv. 5; Alexandr Ivanovich Kalachev, ulitsa Ordzhonikidze, 9/1, kv. 35a; Evgenia Kuzminichna Lyamenkova, Streletskaya ulitsa, 44, kv. 68, all of Moscow; Ljudmila Alexandrovna Glivka, stantsia pobeda, ulitsa Proletarskaya, 3, kv. 1, Moskovskaya oblast; Tamara Andreevna Burtseva, ulitsa Fersmana, 3, kv. 28; Tatyana Mikhailovna Babchinitser, ulitsa Miklukho-Maklaya, 29, korpus 1, kv. 356, both of Moscow, all of U.S.S.R.

[22] Filed: Oct. 29, 1973

[21] Appl. No.: 410,306

Related U.S. Application Data

[63] Continuation of Ser. No. 289,886, Sept. 16, 1972, abandoned.

[30] Foreign Application Priority Data

Sept. 16, 1971 U.S.S.R.............................. 1695225

[52] U.S. Cl. ................................ 252/12, 260/47 C
[51] Int. Cl............................................. C10m 7/52
[58] Field of Search .......... 252/12, 12.2, 12.4, 12.6; 260/47 C

[56] References Cited
UNITED STATES PATENTS

| | | | |
|---|---|---|---|
| 3,287,288 | 11/1966 | Reiling.................................. | 252/12 |
| 3,354,121 | 11/1967 | Knoth et al. ....................... | 260/47 C |
| 3,380,843 | 4/1968 | Davis.................................. | 252/12.2 |
| 3,779,918 | 12/1973 | Ikeda et al. ........................... | 252/12 |
| 3,781,205 | 12/1973 | Cairns et al........................... | 252/12 |

*Primary Examiner*—Daniel E. Wyman
*Assistant Examiner*—I. Vaughn
*Attorney, Agent, or Firm*—Holman & Stern

[57] ABSTRACT

A composition for producing an antifriction structural material comprising a carborane-containing polymer binder and an inorganic heat resistant solid lubricant. The binder is a polyester, a polyamide, a polyimide, or a polyoxadiazole containing carborane units attached to the polymer chain thereof.

A process for producing said antifriction structural material from said composition comprising subjecting the composition to compression moulding at temperatures of up to 400°C, followed by coking at temperatures ranging from 400° to 900°C.

The antifriction material according to the present invention is intended for operation in dry-friction units within a wide temperature range.

12 Claims, No Drawings

ANTIFRICTION STRUCTURAL MATERIAL PRODUCED FROM COMPOSITION COMPRISING CARBORANE-CONTAINING POLYMER BINDERS AND SOLID LUBRICANT

This is a continuation, of application Ser. No. 289,886, filed Sept. 16, 1972 and now abandoned.

The present invention relates to composition for preparing antifriction structural materials and to processes for producing antifriction structural materials from such compositions.

Said antifriction structural materials are suitable for dry friction units.

Compositions for preparing antifriction structural materials suitable for operation in dry friction units are known in the art. Such compositions comprise a polymer binder such as boron-free polymers pertaining to various classes (thermoplastic, thermosetting resins, polyheteroarylenes, and the like) and fillers such as heat-resistant solid lubricants (molybdenum disulphide, graphite, and the like).

Also known in the art is a process for producing antifriction structural materials from the above-mentioned compositions by compression or injection moulding at temperatures of up to 400°C.

Antifriction structural materials produced by the known process from known compositions have some disadvantages, the main disadvantage consisting in a limited temperature range of their performance under dry-friction conditions, which generally does not exceed 300° to 350°C.

It is an object of the present invention to provide such a composition for preparing an antifriction structural material and such a process for producing the latter from said composition which would make it possible to obtain an antifriction material having a range of its performance under dry-friction conditions exceeding 350°C.

This and other objects of the present invention are accomplished by the provision of a composition for preparing an antifriction structural material comprising a polymer binder and fillers, viz., solid heat-resistant lubricants. According to the present invention, the composition contains, as the polymer binder, carborane-containing polymers pertaining to the class of polyesters, or polyamides, or polyimides, or polyoxadiazoles.

It is advisable to employ a composition containing a polymer binder in an amount ranging from 10 to 50 percent by weight and fillers, viz., heat-resistant solid lubricants, in an amount ranging from 50 to 90 percent by weight.

To produce an antifriction material with improved technological properties and increased thermal conductivity, it is advantageous that a composition be employed containing, in addition to a polymer binder and fillers such as solid lubricants, another filler such as metal oxide, for example, copper oxide. The metal oxide content in such composition should be preferably chosen within the range of from 10 to 30 percent by weight based on the weight of heat-resistant solid lubricants.

An antifriction material is prepared from a composition according to the present invention by compression moulding at temperatures of up to 400°C. The moulded composition is further treated in accordance with the present invention, i.e., subjected to coking at temperatures ranging from 400° to 900°C.

Carborane-containing polymers employed as a binder in the composition of the present invention are capable of forming, upon heating (due to destruction-structuring processes), secondary products with a high yield, these products being a heat-resistant high-strength coke. Therefore, the present invention is based on the use, as a binder, of carborane-containing polymers capable of transforming into a high-strength coke during the process of producing an antifriction material (at the coking stage) without any noticeable change in the original weight and shape of the starting sample of the moulded composition. This property of carborane-containing polymers enables the production of an antifriction material operating at extremal temperatures.

As the carborane-containing polymers use may be made, according to the present invention, of, e.g., polymers prepared from various diamines, bisphenols or dicarboxylic acids and bifunctional compounds of o-, m-, or p-carborane of the generic formula R-Y-R, wherein Y represents

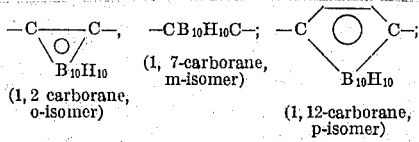

R represents

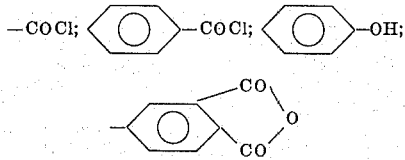

As the fillers, viz., heat-resistant solid lubricants, the composition for producing an antifriction structural material according to the present invention may contain substances of both mineral and artificial origin, possessing antifriction properties. These substances, as it has been mentioned hereinabove, pertain to the group of solid lubricants, which may be primarily exemplified by graphite and boron nitride.

Solid lubricants employed as the fillers in accordance with the present invention should meet one necessary requirement residing in a high resistance to thermo-oxidative destruction and retaining hexagonal lamellar structure without any changes of the original weight at temperatures of up to 600°C and over.

As additional fillers improving technological properties of an antifriction material and thermal conductivity thereof use is made of fine disperse powders of metal oxides such as copper oxide, zinc oxide, and the like.

The composition for an antifriction structural material of the present invention is prepared by mixing, e.g., using a vibro-mill, a fine disperse powder of a carborane-containing polymer with fillers. The intermixing of said components is effected until a homogeneous mixture is formed.

The composition thus prepared is subjected to compression moulding at temperatures of up to 400°C, and preferably at 200°–350°C under a preferable pressure of 1,000 kg/cm². Thereafter, the moulded composition is subjected to coking at temperatures ranging from 400° to 900°C.

An antifriction structural material produced by the above-described process is self-lubricating and is a monolithic mass having a three-dimensional reticulated structure incorporating elements of a self-lubricating filler.

The process of the present invention enables the production of an antifriction material which may be advantageously employed in dry-friction units in a wide temperature range as well as under other conditions excluding the use of liquid and consistent lubricants.

For a better understanding of the present invention, specific examples illustrating the production of a composition and an antifriction structural material based thereon are given hereinbelow.

EXAMPLE 1

4 g. of a carborane-containing polyarylate having with monomer units corresponding to the formula:

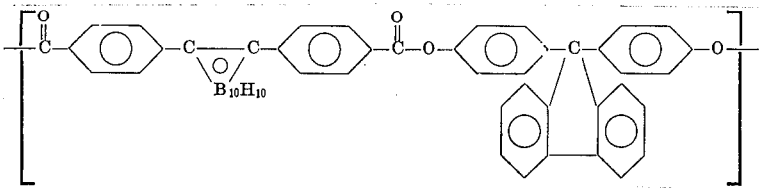

and produced from dichloroanhydride of 1,2-bis(4-carboxyphenyl)-carborane and 9,9-bis(4-hydroxyphenyl)fluorene by a high-temperature polycondensation method at 220°C in an inert atmosphere in alpha-chloronaphthalene medium during 15 hours are mixed in a vibro-mill with 16 g. of fine disperse graphite for 1.5 minutes. The resulting composition is compression moulded at a temperature of 300°C and under a pressure of 1,000 kg/cm², followed by coking under a pressure of 1,000 kg/cm² at a temperature of 500°C and maintaining at this temperature for 2 hours.

EXAMPLE 2

3 g. of a powder-like carborane-containing polyarylate with monomer units of the formula:

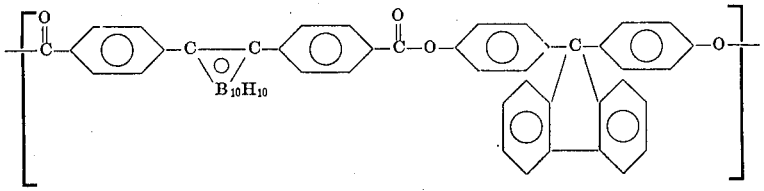

and produced from dichloroanhydride of 1,2-bis(4-carboxyphenyl)-carborane and 1,2-bis(4-hydroxyphenyl)carborane by a high-temperature polycondensation method at 220°C in an inert atmosphere in alpha-chloronaphthalene medium during 15 hours are mixed in a vibro-mill with 7 g. of fine disperse graphite for 1–2 minutes until a homogeneous composition is obtained. The resulting composition is compression moulded at a temperature of 300°C under a pressure of 1,000 kg/cm², followed by coking at a temperature within a range of from 500° to 700°C under a pressure of 1,000 kg/cm² of a period of 2 hours.

EXAMPLE 3

4 g. of a powder-like carborane-containing polyarylate such as described in Example 2 are mixed in a vibro-mill with 16 g. of fine disperse boron nitride for 1.5 minutes. The resulting composition is compression moulded at a temperature of 300°C under a pressure of 1,000 kg/cm² and subjected to coking under 1,000 kg/cm² pressure at a temperature of 500°C for a period of 2 hours.

EXAMPLE 4

4 g. of the powder-like carborane-containing poilyarylate used in Example 2 are mixed polyarylate a vibro-mill with 14.4 g. of graphite and 1.6 g. of fine disperse copper oxide for 1.5 minutes. The resulting composition is compression moulded at a temperature of 300°C and under a pressure of 1,000 kg/cm² and coked at a temperature of 500°C under a pressure of 800 kg/cm² for 1.5 hours and at a temperature of 900°C without pressure in an inert atmosphere for 0.5 hour.

EXAMPLE 5

2 g. of a powder-like carborane-containing polyarylate with monomer units corresponding to the formula:

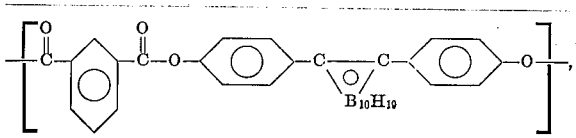

and produced from 1,2-bis(4-hydroxyphenyl)carborane and isophthalic acid dichloroanhydride by a low-temperature polycondensation method at about 45°C in acetone medium for a period of 1 hour are mixed in a vibro-mill with 8 g. of fine disperse graphite for 1–1.5 minutes. The resulting composition is subjected to compression moulding at a temperature within a range of from 200° to 350°C under a pressure of 1,000 kg/cm². Then the resulting article is coked at a temperature of from 400° to 425°C under a pressure of 800 kg/cm² for a period of 2 hours.

EXAMPLE 6

3 g. of a powder-like carborane-containing polyarylate with monomer units corresponding to the formula:

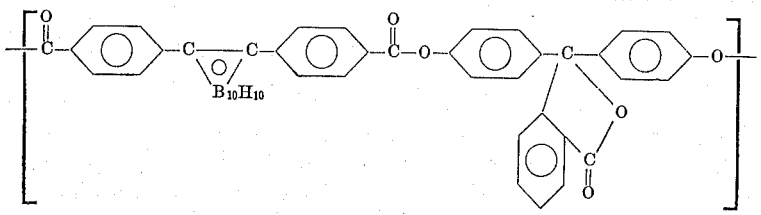

and produced from dichloroanhydride of 1,2-bis(4-carboxyphenyl)-carborane and phenolphthalein by a high-temperature polycondensation method at 220°C in an inert atmosphere in alphachloronaphthalene medium are mixed in a vibro-mill with 6 g. of fine disperse graphite and 1 g. of powder-like copper oxide for 1.5 minutes. The resulting composition is compression moulded at a temperature within a range of from 200° to 300°C under a pressure of 1,000 kg/cm², followed by coking under a pressure of 800 kg/cm² at a temperature of 450°C for a period of 1 hour.

EXAMPLE 7

4g. of a powder-like carborane-containing polyarylate with monomer units corresponding to the formula:

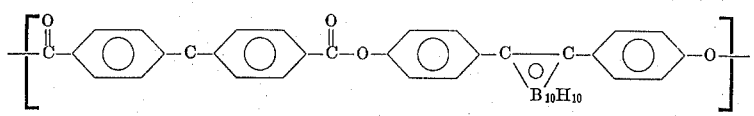

produced from 4,4'-dicarboxyphenyloxide dichloroanhydride and 1,2-bis(4-hydroxyphenyl)carborane by a low-temperature polycondensation method at 45°C in acetone medium for a period of 1 hour are mixed in a vibro-mill with 4 g. of fine disperse boron nitride for 1.5 minutes. The resulting composition is compression moulded at a temperature within a range of from 200° to 250°C under a pressure of 1,000 kg/cm², followed by coking at a temperature of 450°C under a pressure of about 1,000 kg/cm² for a period of 1 hour.

EXAMPLE 8

2 g. of a powder-like carborane-containing polyarylate with monomer units of the formula:

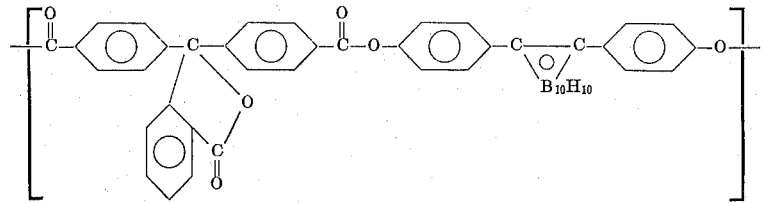

produced from 4,4-diphenylphthalide dicarboxylic acid dichloroanhydride and 1,2-bis(4-hydroxyphenyl)carborane by a low-temperature polycondensation method at a temperature of about 45°C in acetone medium for a period of 1 hour is mixed in a vibro-mill with 7 g. of fine disperse graphite and 1 g. of powder-like copper oxide until a homogeneous mixture is formed. The resulting composition is compression moulded at a temperature within a range of from 250° to 300°C under a pressure of 1,000 kg/cm², followed by coking at a temperature of 450°C under a pressure of 800 kg/cm² for a period of 1 hour.

EXAMPLE 9

4 g. of a powder-like carborane-containing polyamide with monomer units of the formula:

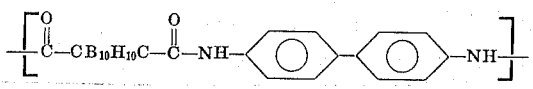

produced from 1,7-carboranedicarboxylic acid dichloroanhydride and benzidine by a low-temperature polycondensation method at room temperature in tetrahydrofuran medium for a period of 1 hour are mixed in a vibro-mill with 16 g. of fine disperse graphite for 1.5 minutes. The resulting homogeneous composition is compression moulded at a temperature of 250°C under a pressure of 1,000 kg/cm². The moulded article thus produced is subjected to coking under a pressure of 1,000 kg/cm² at a temperature of 450°C for a period of 2 hours and then without pressure in an inert atmosphere at a temperature of 900°C for 1 hour.

EXAMPLE 10

3 g. of a powder-like carborane-containing polyamide with monomer units of the formula:

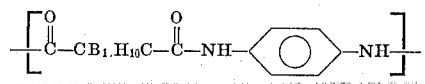

produced from 1,7-carborane dicarboxylic acid dichloroanhydride and p-phenylene diamine by a low-temperature polycondensation method at room temperature in tetrahydrofuran medium for a period of 1 hour are mixed in a vibro-mill with 6 g. of fine disperse graphite and 1 g. of powder-like copper oxide for 1.5 minutes. The resulting homogeneous composition is compression moulded at 250°C under a pressure of 1,000 and coked at a temperature within a range of from 450° to 500°C under a pressure of about 800 kg/cm² and then without pressure in an inert atmosphere for 1 hour at a temperature of 900°C.

EXAMPLE 11

4 g. of a powder-like carborane-containing polyamide with monomer units of the formula:

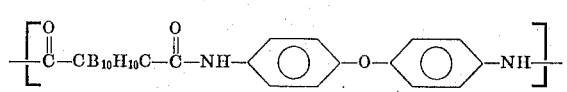

produced from 1,7-carborane dicarboxylic acid dichloroanhydride and 4,4'-diaminediphenyl oxide by a low-temperature polycondensation method at room temperature in tetrahydrofuran medium are mixed in a vibro-mill with 5 g. of fine disperse boron nitride and 1 g. of powder-like copper oxide for 1.5 minutes. The resulting composition is compression moulded at a temperature of 250°C under a pressure of 1,000 kg/cm² and coked at a temperature of 450°C under the pressure of 1,000 kg/cm² for a period of 2 hours.

EXAMPLE 12

4 g. of a powder-like carborane-containing polyamide with monomer units of the formula:

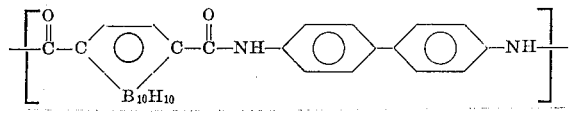

produced from 1,12-carborane dicarboxylic acid dichloroanhydride and benzidine by a low-temperature polycondensation method at room temperature in tetrahydrofurane medium for a period of 1 hour are mixed in a vibro-mill for 1.5 minutes with 4 g. of fine disperse graphite until a homogeneous composition is obtained. The resulting composition is compression moulded at a temperature of 250°C and under 1,000 kg/cm² pressure, followed by coking at a temperature of 450°and under 1,000 kg/cm² pressure for a period of 2 hours.

EXAMPLE 13

In this example, for the production of an antifriction composition use is made of a carborane-containing poly-1,3,4-oxadiazole with monomer units corresponding to the formula:

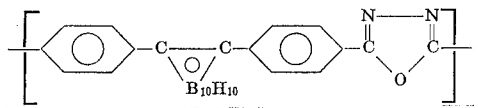

produced from dichloroanhydride of 1,2-bis(4-carboxyphenyl)-carborane and hydrazine phosphane $N_2H_4·H_3PO_4$ by a high temperature polycyclization method in polyphosphoric acid. Said carborane-containing powder-like polyoxadiazole in an amount of 2 g. is mixed in a vibro-mill with 6 g. of fine disperse boron nitride and 2 g. of powder-like copper oxide for 1.5–2 minutes. The resulting homogeneous composition is compression moulded at a temperature of 320°C and under a pressure of 1,000 kg/cm² and coked at a temperature of 450°C under a pressure of 1,000 kg/cm² for a period of 2 hours.

EXAMPLE 14

4 g. of a powder-like carborane-containing polyoxadiazole such as used in Example 13 are mixed in a vibro-mill with 6 g. of fine disperse graphite for 1.5–2 minutes until a homogeneous composition is obtained. The resulting composition is compression moulded at a temperature of about 320°C under a pressure of 800 kg/cm² and coked at a temperatue of 450°C and under a pressure of 800°for a period of 2 hours.

EXAMPLE 15

Use is made in this Example, for the production of an antifriction composition, of a carborane-containing polyimide with monomer units corresponding to the formula:

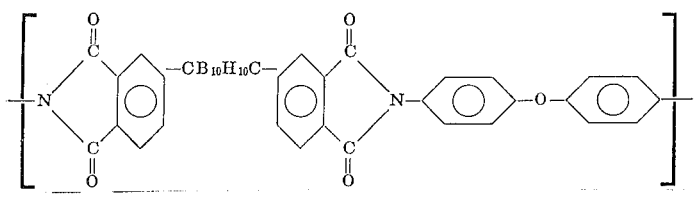

produced from dianhydride of 1,7-bis(3,4-dicarboxyphenyl)-carborane and 4,4'-diaminodiphenyl oxide by a two-stage low-temperature polycondensation method. The first stage is performed at room temperature in N,N-dimethylacetamide, while the second stage comprises polycyclization performed with a dehydration mixture.

2 g. of the powder-like polyamide produced by the above-described process are mixed in a vibro-mill with 8 g. of powder-like graphite for 1.5 minutes. The resulting homogeneous composition is compression moulded at a temperature of 350°C and under a pressure of 1,000 kg/cm², followed by coking at a temperature of 500°C and under a pressure of 1,000 kg/cm² for a period of 2 hours.

EXAMPLE 16

2 g. of the powder-like carborane-containing polyimide employed in Example 15 are mixed in a vibro-mill with 16 g. of fine disperse graphite and 2 g. of powder-like copper oxide for 1.5 minutes. The resulting homogeneous composition is compression moulded at a temperature of 350°C and under a pressure of 1,000 kg/cm², followed by coking at a temperature of 500°C and under a pressure of 1,000 kg/cm² for a period of 2 hours.

Articles made of the antifriction material as produced according to the procedure described in Examples 1 to 16 represent monolithic parts in the form of bushings, bearings and other parts of various shapes. When required, reinforced articles may be produced and machined to predetermined dimensions.

Articles made of the antifriction material according to Examples 1 to 16, when used in dry-friction units (depending on environment conditions of the unit operation), have a coefficient of friction within a range of from 0.04 to 0.16. Specific advantage of such articles resides in their capability of operating without any deformation, while retaining satisfactory wear-resistance at extremal temperatures ranging from 350° to 500°C.

The antifriction material as produced in accordance with Examples 1 to 16 has a high mechanical strength. Thus, its ultimate compression strength exceeds 500 kg/cm² and in some cases may be even as high as 2,000 kg/cm².

In the foregoing Examples there have been given preferable proportions of the components and the conditions of their processing. It is, however, evident to those skilled in the art that various modifications, depending on requirements to the final antifriction material, are possible without departing from the spirit and scope of the present invention as claimed in the appended claims.

We claim:

1. A composition for preparing an antifriction structural material comprising 10 to 50 percent by weight of a polymer binder selected from the group consisting of polyesters, polyamides, polyimides, and polyoxadiazoles containing carborane units attached to the polymer chain thereof, and 90 to 50 percent by weight of an inorganic heat resistant solid lubricant.

2. The composition of claim 1, further comprising a metal oxide filler.

3. The composition of claim 2, wherein said metal oxide filler is present in an amount of 10 to 30 percent by weight of said solid lubricant.

4. The composition of claim 1, wherein said solid lubricant is selected from the group consisting of molybdenum disulfide, graphite, and boron nitride.

5. The composition of claim 2, wherein said metal oxide filler is selected from the group consisting of copper oxide and zinc oxide.

6. A process for producing an antifriction structural material from a composition comprising 10 to 50 percent by weight of a polymer binder selected from the group consisting of polyesters, polyamides, polyimides, and polyoxadiazoles containing carborane units attached to the polymer chain thereof, and 90 to 50 percent by weight of an inorganic heat resistant solid lubricant, said process comprising the steps of:

a. mixing said binder and said solid lubricant;
b. compression moulding the mixture at a temperature up to 400°C, and
c. coking the moulded mixture at a temperature ranging from 400° to 900°C.

7. The process of claim 6, wherein a metal oxide filler is additionally mixed into said composition in step a).

8. The process of claim 7, wherein said metal oxide filler is used in an amount of 10 to 30 percent by weight of said solid lubricant.

9. The process of claim 6, wherein said solid lubricant is selected from the group consisting of molybdenum disulfide, graphite, and boron nitride.

10. The process of claim 7, wherein said metal oxide filler is selected from the group consisting of copper oxide and zinc oxide.

11. The process of claim 6, wherein step b) is conducted at a temperature of 200°–350°C and a pressure of 1,000 kg/cm$^2$.

12. An antifriction structural material produced by the process of claim 6.

* * * * *